United States Patent
Eilos et al.

(10) Patent No.: US 8,598,237 B2
(45) Date of Patent: Dec. 3, 2013

(54) METHOD FOR ADJUSTING HYDROGEN TO CARBON MONOXIDE RATIO IN SYNTHESIS GAS

(75) Inventors: Isto Eilos, Porvoo (FI); Jukka Koskinen, Espoo (FI); Marja Tiitta, Porvoo (FI); Sami Toppinen, Helsinki (FI); Heli Vuori, Espoo (FI)

(73) Assignee: Neste Oil Oyj, Espoo (FI)

( * ) Notice: Subject to any disclaimer, the term of this patent is extended or adjusted under 35 U.S.C. 154(b) by 0 days.

(21) Appl. No.: 13/539,862

(22) Filed: Jul. 2, 2012

(65) Prior Publication Data

US 2013/0005838 A1 Jan. 3, 2013

Related U.S. Application Data

(60) Provisional application No. 61/503,460, filed on Jun. 30, 2011.

(30) Foreign Application Priority Data

Jun. 30, 2011 (EP) .................................. 11172052

(51) Int. Cl.
  *C07C 27/00* (2006.01)
(52) U.S. Cl.
  USPC ............ 518/703; 518/702; 518/704; 518/705
(58) Field of Classification Search
  USPC .................................................. 518/700–705
  See application file for complete search history.

(56) References Cited

U.S. PATENT DOCUMENTS

| 4,039,429 A * | 8/1977 | Van Klinken et al. .......... 208/50 |
| 2005/0035326 A1 | 2/2005 | Meyer et al. |
| 2006/0272502 A1 * | 12/2006 | Van Grinsven et al. ......... 95/235 |
| 2008/0115415 A1 * | 5/2008 | Agrawal et al. ................. 48/101 |
| 2008/0300327 A1 | 12/2008 | Fujimoto et al. |
| 2009/0246120 A1 | 10/2009 | Raman et al. |
| 2010/0036181 A1 | 2/2010 | Diebold et al. |

FOREIGN PATENT DOCUMENTS

| DE | 26 10 892 A1 | 9/1977 |
| DE | 43 36 790 A1 | 5/1995 |
| DE | 196 10 846 A1 | 9/1997 |
| DE | 10 2007 051 181 A1 | 4/2009 |
| WO | 2009/059920 A2 | 5/2009 |
| WO | WO 2010/017372 A1 | 2/2010 |
| WO | 2011/141635 A1 | 11/2011 |

OTHER PUBLICATIONS

Zhen et al., "Investigation on Sulfur Poisoning Kinetics for the High Temperature Shift Reaction Over the B108 Catalyst", Chemical Reaction Engineering and Technology, Mar. 1988, pp. 17-29, vol. 4, No. 1 (English abstract enclosed).

(Continued)

*Primary Examiner* — Jafar Parsa
(74) *Attorney, Agent, or Firm* — Buchanan Ingersoll & Rooney PC (57) ABSTRACT

A method for adjusting hydrogen to carbon monoxide ratio of syngas contaminated by sulfur impurities involving a water gas shift (WGS) reaction. In light of the presence of the sulfur impurities, the WGS can be implemented as a sour gas shift. WGS can provide good results by using a non-sulfided catalyst. Conditions can be employed which contribute to further enhanced CO-conversion in the reaction. The hydrocarbons or derivatives thereof obtainable from the method can further be refined and used for production of fuels or lubricants for combustion engines.

26 Claims, 1 Drawing Sheet

(56) References Cited

OTHER PUBLICATIONS

Brandin et al., "Unit Operations for Production of Clean Hydrogen-Rich Synthesis Gas From Gasified Biomass" Biomass and Bioenergy, Jun. 22, 2011, vol. 35, Supplement 1, pp. s8-s15.

Lohitharn et al., "Fe-based Fisher-Tropsch Synthesis Catalysts Containing Carbide-Forming Transition Metal Promoters" Journal of Catalysis, Apr. 2008, vol. 255, No. 1, pp. 104-113.

Notification of Transmittal of the International Search Report (Forms PCT/ISA/220 and PCT/ISA/210) and the Written Opinion of the International Searching Authority (Form PCT/ISA/237) dated Oct. 15, 2012, issued in corresponding International Application No. PCT/FI2012/050660. (13 pages).

Search Report Issued on Nov. 17, 2011, by the European Patent Office for Application No. 11172052.0.

Marono et al., "Hydrogen-rich gas production from oxygen pressurized gasification of biomass using a Fe-Cr Water Gas Shift catalyst", International Journal of Hydrogen Energy, Jan. 2010, pp. 37-45, vol. 35, No. 1.

Wilson et al., "Shift Conversion of Synthesis Gas Containing Sulfur, Dust, and Carbon Dioxide", Industrial & Engineering Chemistry Process Design and Development, Oct. 1968, pp. 526-529, vol. 7, No. 4.

Ratnasamy et al., "Water Gas Shift Catalysis", Catalysis Reviews, Feb. 2009, pp. 325-440, vol. 51, No. 3.

Twigg, Catalyst Handbook, $2^{nd}$ Edition, 1989, pp. 306.

Roberts et al., "Alcohol Synthesis in a High-Temperature Slurry Reactor", Department of Chemical Engineering, North Carolina State Univ., Sep. 1990-Dec. 1995, pp. 297-311.

\* cited by examiner

METHOD FOR ADJUSTING HYDROGEN TO CARBON MONOXIDE RATIO IN SYNTHESIS GAS

RELATED APPLICATION(S)

This application claims priority under 35 U.S.C. §119 to European Patent Application No. 11172052.0 filed in Europe on Jun. 30, 2011, the entire content of which is hereby incorporated by reference in its entirety. This application also claims priority under 35 U.S.C. §119 of U.S. Provisional Application No. 61/503,460 filed on Jun. 30, 2011, the entire content of which is hereby incorporated by reference in its entirety.

FIELD

Disclosed is a method relating to the field of hydrocarbon processing, for example, adjusting the feed for hydrocarbon or hydrocarbon derivative synthesis. Provided is a method for increasing the hydrogen-to-carbon monoxide ratio in said feed which can contribute to the performance of the overall process. For example, said adjusting can be applicable in biomass to liquid processes (BTL) and/or in converting biomass to hydrocarbons, alcohols or alkyl carbonates.

BACKGROUND

A carbonaceous biomass raw material can be subjected to conditions converting same into gases. One exemplary gas is syngas which includes carbon monoxide and hydrogen as components. Industrially, gases thus obtained can further be refined to hydrocarbons or other organic compounds. To optimize the yield and reduce or avoid irregularities in the production process, further steps can be employed.

One exemplary step is increasing the hydrogen-to-carbon monoxide ratio in the feed of the synthesis reactor. A strategy for this is a water gas shift (WGS) reaction. See, for example, C. Ratnasamy and J. P. Wagner, Water Gas Shift Catalysis, Catalysis Reviews, 51: 3, 325-440 (2009). In WGS, water and carbon monoxide can react to form hydrogen and carbon dioxide.

When applying a WGS process, one can choose between or use combinations of, for example, four options: high temperature shift (HTS), medium temperature shift (MTS), low temperature shift (LTS) and sour gas shift. Each option can have exemplary conditions depending on the catalysts used. An HTS reactor can have a temperature range of 350-600° C. and the exit gas can have a CO level of a few vol-%. In some applications, the CO level can be further decreased with a LTS reactor after the HTS. Because the temperature range of the LTS can be between 150-300° C., an inter-stage cooler can be used. After the LTS reactor, CO level can be even less than 1 vol-%.

Depending on the source of the syngas, the gas mixture may contain significant amounts of impurities influencing the WGS reaction. Also, side reactions can produce unwanted compounds even from pure syngas. Considering the choice of a catalyst, sulfur compounds can be relevant, because WGS catalysts can have a very poor sulfur tolerance. Two ways to deal with sulfur include, for example, removing same from the feed gas prior to WGS process, or using a sulfur tolerant WGS catalyst. When sulfur tolerant catalyst is applied, the WGS process can be referred to as a sour gas shift reaction.

For sour gas shift reactions, it can be difficult to find suitable catalysts that are both active and tolerate sulfur. A catalyst that can be used is a CoMo-catalyst within temperature range between 230-470° C. These catalysts can have a very good sulfur tolerance. For example, sulfidation may be employed. Their activity in the WGS may not be as good as that of LTS catalysts in the sulfur-free feed gas. Their activity can be dependent on successful presulfiding. According to M. V. Twigg, Catalyst Handbook, 2. ed., Wolfe Publishing Ltd, Frome 1989, 608, p. 306, catalysts applied for HTS, for example, FeCr catalysts, can also be active in sulfided form, but the activity thereof can reduce to 50% of the original HTS activity.

Proper functioning of sulfided catalysts can depend on a minimum sulfur level. With syngas of, for example, biomass origin, sulfur content may vary depending on the raw material batches. For example, the sulfur content may even be too low for the sour gas shift catalyst desirable conditions. In these cases, adding sulfur derivative to WGS reaction to provide a sufficient sulfur level can increase the burden to remove the same within subsequent reaction steps.

The water gas shift reaction can be designed for syngas originated from coal or natural gas. The composition, for example, amounts of the main components, impurities and trace components, can differ depending on the origin of the raw material and can have characteristics originating from the biomass used. For example, methods and strategies that are successful for certain raw materials may not necessarily be readily applicable to biomass gasification and further refinement.

SUMMARY

According to an exemplary aspect, a method for adjusting hydrogen to carbon monoxide ratio in syngas is disclosed, the method comprising: providing a syngas produced from a biomass raw material, said syngas comprising carbon monoxide, hydrogen, 10-40 vol-% of carbon dioxide, and at least one sulfur derivative as an impurity; and converting at least a part of said carbon monoxide in the presence of steam to carbon dioxide and hydrogen with a water gas shift reaction in the presence of a FeCr catalyst.

According to an exemplary aspect, a method for producing hydrocarbons from a biomass raw material is provided, the method comprising: gasifying a biomass raw material in the presence of oxygen to produce a gas comprising carbon monoxide, 10-40 vol-% of carbon dioxide, hydrogen, hydrocarbons, and at least one sulfur derivative as impurity; converting at least a part of said carbon monoxide to carbon dioxide and hydrogen with a water gas shift reaction in the presence of a FeCr catalyst; converting in a Fisher-Tropsch reactor at least a part of the carbon monoxide and hydrogen into a hydrocarbon composition comprising $C_4$-$C_{90}$ hydrocarbons; and recovering at least a part of the $C_4$-$C_{90}$ hydrocarbons.

It can be desirable to provide a WGS catalyst active in variable sulfur concentrations.

According to an exemplary aspect, disclosed is a process suitable for producing hydrocarbons from biomass.

When applying the WGS reaction, it can be desirable to minimize the carbon monoxide and thus maximize its conversion, for example, when used as a part of ammonium production. Carbon monoxide can be a valuable reactant for the following synthesis. Applying WGS prior to hydrocarbon or hydrocarbon derivative synthesis, can differ from other WGS applications, for example, as it is may not be desirable to maximize $H_2$/CO ratio but the ratio can be low compared to, for example, desirable conditions of a hydrogen production unit. For example, this can mean that catalyst activity and desired selectivity conditions may not be as strict. A proper feed can be provided for hydrocarbon or hydrocarbon derivative synthesis by adjusting by optimal WGS reaction the hydrogen to carbon monoxide ratio to about at least 1.7.

According to an exemplary aspect, a process of converting biomass raw material to hydrocarbon or derivatives thereof can be implemented by involving a water gas shift reaction using a FeCr catalyst after gasification and before hydrocarbon or hydrocarbon derivative synthesis. For example, provided is a method for adjusting hydrogen to carbon monoxide ratio in syngas, comprising: providing a syngas from biomass raw material, said syngas comprising carbon monoxide, hydrogen, 10-40 vol-% of carbon dioxide, and at least one sulfur derivative (such as a sulfur-containing compound) as impurity; and converting a part of said carbon monoxide in the presence of steam to carbon dioxide and hydrogen with a water gas shift reaction employing a FeCr catalyst.

The FeCr catalyst used in the WGS can be efficient in providing good conversion from carbon monoxide to carbon dioxide, and at the same time, tolerant for the impurities present in the feed. For example, the tolerance of a sulfur derivative as an impurity can be desirable. Long-term results with, for example, only moderate loss of activity and practically no detrimental sulfur accumulation can be shown for a FeCr catalyst under a feed containing sulfur. The presence of ammonium ($NH_3$) in the WGS feed can increase the CO-conversion. Without being bound to any particular theory, it is believed that the overall composition, for example, the carbon dioxide content of 10-40 vol-%, in the feed obtained from biomass together with steam can contribute to the performance and endurance of the catalyst.

According to an exemplary embodiment, a method for producing hydrocarbons or derivatives thereof is provided, comprising: producing from biomass raw material a gas comprising carbon monoxide, hydrogen, 10-40 vol-% of carbon dioxide and at least one sulfur derivative (such as a sulfur-containing compound) as an impurity; converting a part of said carbon monoxide in the presence of steam to carbon dioxide and hydrogen with a water gas shift reaction employing a FeCr catalyst; converting in a synthesis reaction at least a part of the carbon monoxide and hydrogen contained in the gas into a product selected from hydrocarbon composition or an organic derivative thereof; and recovering the product.

DETAILED DESCRIPTION

According to an exemplary embodiment, provided is a method for adjusting hydrogen to carbon monoxide ratio in syngas, comprising: providing a syngas from biomass raw material, said syngas comprising carbon monoxide, hydrogen, 10-40 vol-% of the dry gas of carbon dioxide, and at least one sulfur derivative as impurity; and converting a part of said carbon monoxide in the presence of steam to carbon dioxide and hydrogen with a water gas shift reaction employing a FeCr catalyst.

For example, in a first step, a gas comprising carbon monoxide, hydrogen, 10-40 vol-% of the dry gas of carbon dioxide and sulfur derivatives is provided. For example, the gas mixture can be rich in hydrogen and carbon monoxide, so it can be called syngas (synthesis gas). One exemplary way of providing a syngas from biomass raw material is gasification of biomass raw material, because it can provide a gaseous mixture of the gases mentioned comprising carbon dioxide 10-40 vol-% of the dry gas. Other means for providing said syngas from biomass raw material comprise, for example, refining exhaust gases from waste treatment, recovered gases from landfills, fermentation processes, etc.

In an exemplary embodiment, a method for producing $C_4$-$C_{90}$ hydrocarbons from biomass raw material is provided, comprising gasifying said biomass raw material to produce a gas comprising carbon monoxide, hydrogen, 10-40 vol-% of carbon dioxide and sulfur derivatives; converting a part of said carbon monoxide in the presence of steam to carbon dioxide and hydrogen with a WGS reaction employing a FeCr catalyst; converting in a FT-reactor at least a part of the carbon monoxide and hydrogen contained in the gas into $C_4$-$C_{90}$ hydrocarbons; and recovering the $C_4$-$C_{90}$ hydrocarbons.

In an exemplary embodiment, a process for producing hydrocarbons or derivatives thereof from a biomass raw material is provided. Biomass can encompass any biological material from living, or recently living organisms of plant, animal or microbial origin. For example, forest residues, such as dead trees, branches and tree stumps, yard clippings, wood chips and garbage are usable in biomass to liquid processes (BTL). Carbon-rich waste from industrial processes, such as pulp and paper production, oil pressing or other food industry can be used. When using biomass as raw material, it can be desirable to have some flexibility and adaptability built in and designed in the production facilities, lines and processes. The raw material, even though classifiable as biomass, can vary within even the same gasification unit depending on the availability of different materials. As biology is involved, natural causes for variability can include, for example, geography, soil, seasons, yields, etc. Also politics and markets can define accessibility and affordability of the biomass resources for these purposes. In an exemplary embodiment where only biomass as raw material is used, it can be heterogeneous with respect to, for example, bulk, humidity, carbon content, impurity and other factors that can affect the process.

The composition of the product gas can depend on the biomass raw material resource. For example, wood, bark, cereals, straw, bagasse, etc., are all possible raw materials for biofuel production. For ethical reasons, non-food raw materials can be used. Woody biomass is composed of, for example, hemicellulose, cellulose, lignin and organic compounds and minerals. In biomass the carbon content level can be about 50 wt %, hydrogen 6 wt % and oxygen 42 wt %. These levels are exemplary for woody biomass. Examples are set forth in Table 1.

TABLE 1

CHO content dependent on the biomass raw material sources

| | Willow branches | Pine | Forest residue | Saw dust |
|---|---|---|---|---|
| C (wt %) | 45.5 | 51.74 | 50.8 | 51.02 |
| H (wt %) | 6.1 | 6.09 | 6.0 | 6.00 |
| O (wt %) | 44.0 | 41.81 | 39.4 | 42.50 |

Components of syngas or synthesis gas include carbon monoxide and hydrogen. Syngas or synthesis gas can contain other gases as well. The quantities of other substances can be influenced by several factors such as, for example, the original habitat and the type of the biomass. These substances can include N, Si, Ca, Mg, K, Na, P, S, Cl, F, Al, Fe, Mn, Cu, Zn, Co, Ni, Cr, Hg, Pb, Cd, V and tars. Tar can include a mixture of (poly)cyclic aromatic hydrocarbons and some oxygen-containing hydrocarbons. In the biomass gasification process, at least a part of the inorganic matter can form solid particles (ash), which can be separated from syngas by filtering. Inorganic compounds can also form gaseous substances which can be more difficult to separate and can influence the WGS reaction. For example, sulfur content, for example, present as H2S, is about 50-250 ppm in the gas when forest residue is used as a feedstock to gasifier.

Gasifying the biomass raw material for producing a syngas can take place in the presence of oxygen. For fuel production by the FT process, an oxygen-containing gas can be used for the gasification, for example, in order to attain reasonably high temperatures and to reduce the formation of nitrogenous by-products. Examples of suitable gases are air and oxygen gas. Gasification can be promoted by feeding steam, air or oxygen into the reactor, for example, oxygen or oxygen in combination with steam.

The biomass can be gasified in a fluidized bed reactor or a circulating fluidized bed reactor (CFB) gasifier in the presence of oxygen at a temperature in the range of about 700 to 1400° C. For example, gasifying the raw material in the presence of oxygen can be performed at a temperature of at least 1000° C. At these conditions, biomass, such as lignocellulosic materials, can produce a gas containing carbon monoxide and hydrogen, thus the components of syngas, as well as carbon dioxide and water gas. It can contain hydrocarbons and impurities, such as sulphur and nitrogen derivatives and trace metals and derivatives thereof.

In the gasification reactor, the circulating bed can be formed by a granular or particulate bed material such as, for example, sand and/or a similar inorganic material. CaO, which can be obtained by introducing Ca carbonate into the gasification reactor, can be used as a catalyst for the decomposition of tars in the gasification. The biomass can be in the form of particles, granules or chips or similar coarse or finely divided parts. According to an exemplary embodiment, the biomass can be used roughly as such as harvested. According to an exemplary embodiment, the biomass can be milled or grinded to an average particle or granule size of less than about 50 mm, for example, less than about 40 mm, for example, about 25 to not more than 1 mm before gasification. The biomass can also be fed into the gasifier in the form of a liquid stream, for example, a liquid stream obtained by pyrolysis of biomass.

In the case of solid biomass, it can be fed into the reactor with a moisture content of less than 30% by weight, for example, less than 25% by weight, for example, about 5 to 20% by weight.

Depending on the temperature, the qualities of the biomass, and the concentration of oxygen, the "carbon conversion", i.e., conversion of elemental carbon contained in the raw material into light compounds, hydrocarbons, derivatives thereof and tar, can be higher than 70%, for example, higher than 75%, for example, higher than 80% by weight of the carbon in the raw material.

The overall process can include a step wherein at least some of aromatic compounds contained in the gas obtained by gasification of the raw material are removed before further processing carbon monoxide and hydrogen into desired C4-C90 hydrocarbons or derivatives thereof. For example, the aromatic compounds removed can comprise at least one, for example, two compound(s) selected from benzene, toluene and naphtalene. Benzene removal can be desirable, as it can be damaging to both occupational health and environment. For example, benzene and naphtalene can clog process equipment at low process temperatures.

The exhaust from gasification may not be optimal feed for synthesis reactors. The hydrogen to carbon monoxide ratio can be low, for example, from 0.5 to 1.0 after gasification and optional reformation, and it can be desirable to increase the ratio. Adjusting hydrogen to carbon monoxide ratio can aim at raising said ratio to a value of at least 1.5, for example, at least 1.7. Optimal value for methanol synthesis can be about 2 for other alcohol syntheses at highest 2 and for FT reaction from 1.7 to about 2. See FIG. 7 of Roberts et al., Alcohol Synthesis in a High Temperature Slurry Reactor, Department of Chemical Engineering, North Carolina State University, Period of Performance Sep. 25, 1990-Dec. 31, 1995, pp. 297-311. However, a higher value produced during WGS reaction can be optimal depending on the overall process. For example, as only a part of the carbon monoxide is converted in WGS reaction, the process can be designed in a desirable manner to provide a desired ratio. A part of the feed gas can be bypassed without subjecting it to WGS reaction, thereafter combining said reacted and bypassed portions in optimal proportions to obtain desired hydrogen to carbon monoxide ratio. Said parts and portions can be calculated in any suitable manner.

As an exemplary embodiment, the reactants of the FT reaction can be present in a molar ratio of at least 1.7, for example, about 2. The optimal ratio can be based on reaction stoichiometry, wherein a ratio of 2 can result in efficient consumption of the starting materials. This can apply when cobalt catalyst is employed. Iron catalyst is usable as well, wherein the ratio of 1.8 can be exemplary due to side reactions affecting the overall balance.

In an exemplary embodiment, said increase of hydrogen to carbon monoxide ratio can be achieved by subjecting the gas to a water gas shift reaction, in which hydrogen is produced by reacting carbon monoxide in the presence of steam to produce carbon dioxide and hydrogen. In said conversion of water and carbon monoxide to carbon dioxide and hydrogen, for example, very good results can be obtained using a FeCr catalyst with biomass based syngas. Steam in the feed can be beneficial to the catalyst, as it can protect it from over-reduction. For example, exaggerated excess of steam can adversely effect the equilibrium reactions, as H2/CO ratio can increase. The amount of steam in the feed taking factors (temperature, flow rate, etc.) influencing the reaction rate into account can be calculated.

Even though sulfided catalyst can be used with a feed containing sulphur, in exemplary experiments, sulfidation pretreatment is not necessary or employed with the feed composition obtained from biomass gasification. With sulfur content in the gas is here meant the total amount of sulfur derivatives calculated as elemental sulfur. In an exemplary method, sulfur content in said gas entering WGS can be less than 900 ppm, for example, from 30 ppm to 500 ppm, for example, from 50 to 250 ppm. Other impurities present in the gas fed to WGS reactor can be, for example, approximately: NH3 50-10000 ppm, HCN 5-10% of the amount of NH3, CO2 from 10 to 40 vol-%, HCl from 20 to 200 ppm and aromatic compounds from 1000 to 4000 mass-ppm, wherein benzene can be from 200 to1000 ppm and naphthalene from 20 to 100 ppm. Measurements given as ppm refer to mass-ppm.

The FeCr catalyst can include a catalyst containing Fe2O3 and Cr2O3. The FeCr catalyst can contain about 80-90% (wt) of Fe2O3, 8-10% Cr2O3. The balance can be promoters and stabilizers like copper oxide, Al2O3, alkali, MgO, ZnO, etc. The BET surface areas of the catalyst can be between 30-100 m2/g depending on, for example, the Cr2O3 and Al2O3 contents and calcination temperatures. See, for example, Ratnasamy and Wagner, p. 334, last paragraph. One exemplary function of Cr2O3 and Al2O3 is to reduce or prevent sintering and consequent loss of surface area of the iron oxide crystallites during the start-up and further operation. Pure Fe2O3, when used as a HTS catalyst, can deactivate quickly due to sintering of the iron oxide crystallites. In addition to being a textural promoter reducing or preventing the sintering of iron oxide crystallites, $Cr_2O_3$ can also function as a structural promoter to enhance the intrinsic catalytic activity of $Fe_2O_3$. As supplied, the $Fe_2O_3$-$Cr_2O_3$ catalyst can be a solid solution of a $Fe_2O_3$ and $Cr_2O_3$, wherein the $Cr^{3+}$ ion substitutes, isomorphously and partially, the $Fe^{3+}$ ions in the a $Fe_2O_3$ lattice framework. For example, even though most of the chromium ions in the fresh catalyst can be present in the $Cr^{3+}$ state, a small fraction, for example, on the surface, can be present in the hexavalent state, as $CrO_3$. For example, during start-up in the industrial reactor, $Fe_2O_3$ can be reduced to $Fe_3O_4$ in syngas at 300-450° C.

For example, the $Fe_2O_3$-$Cr_2O_3$ catalyst is not extremely sensitive to the presence of sulfur and can tolerate the presence of substantial amounts of sulfur due to the reversibility of the sulfidation reaction. See, for example, Ratnasamy and Wagner, p. 336, eq. 20. The $Fe_2O_3$-$Cr_2O_3$ catalysts can tolerate sulfur, for example, up to even about 1000 ppm. The $Fe_2O_3$-$Cr_2O_3$ catalyst can be sulfided during use and, in the sulfided state its activity can be much lower than in the oxide state. See, for example, Ratnasamy and Wagner, page 362. The rate of the HTS reaction can be limited by pore diffusion and linearly dependent on the steam partial pressures under industrial conditions. See, for example, Ratnasamy and Wagner p. 337. While maintaining sufficiently high $H_2O/H_2$ ratios can be desirable, passing steam, in the absence of reductants like $H_2$ and CO, over the reduced ironoxide-chromium oxide catalyst, can reoxidize the $Fe_3O_4$ to $Fe_2O_3$ and lower catalytic activity. See, for example, Ratnasamy and Wagner Eq. 19.

The experiments conducted with WGS here show, for example, that improved carbon monoxide conversion can be obtained when the water gas shift reaction is conducted at a temperature of at least 270° C., for example, between 300° C. and 510° C., for example, between 380° C. and 430° C. to provide sufficient catalyst function and consequent CO-conversion. In Ratnasamy, C. and Wagner, J. P. (2009) 'Water Gas Shift Catalysis', Catalysis Reviews, 51: 3, p. 340, I. 1-3, value 510° C. was mentioned as the maximum operating temperature. A fresh catalyst can include a catalyst which has not been sulfided prior to introduction into the WGS reactor construction.

In a comparative process, the activity of a FeCr catalyst can decrease even to half of the original when $H_2S$ has been added to feed. This can apply to a comparative process conducted at atmospheric pressure and for significantly higher feed rates with feed composition simulating coal-derived syngas. The deactivating effect of $H_2S$ can decrease at higher pressures. This can be due to, for example, either metal sulfide formation being inhibited or metal sulfide reoxidation being promoted due to higher partial pressure of other components in the gas. The feed composition, GHSV and reactor pressure can influence the extent of the deactivating effect of $H_2S$.

The pressure of the WGS reaction can be from 1 to 10 bar. Pressure can have an effect in the WGS. For example, an undesirable effect of sulfur decreasing the carbon monoxide conversion can be reduced or almost eliminated using exemplary conditions and at a pressure of 5 bar. For example, the WGS reaction can be conducted at a pressure of from 3 to 6 bar.

The space velocity, GHSV, can be in the range of about 3,000 to 5,000 h-1, or about 1,000 to 10,000 h-1.

After the WGS reaction, and optional washes, the gas can be fed to a synthesis reactor. The synthesis can include hydrocarbon synthesis, alcohol, such as butanol, synthesis or alkyl carbonate synthesis. For example, hydrocarbon synthesis employing Fisher-Tropsch can be employed. Exemplary methods for adjusting hydrogen to carbon monoxide ratio can be applied to other synthesis reactions as well.

According to an exemplary embodiment relating to FT-synthesis, in the FT reactor at least a part of the carbon monoxide and hydrogen contained in the gas can be converted into a hydrocarbon composition comprising C4-C90 hydrocarbons, for example, hydrocarbons having carbon numbers in the range of from 4 (inclusive) to 90 (inclusive). The products obtained in the Fischer-Tropsch reaction, for example, said C4-C90 hydrocarbons, can include distillates and hydroconverted products, for example, fuels such as naphtha, kero and diesel, base oils and n-paraffins, light detergent feedstocks and wax.

The Fischer-Tropsch synthesis can be carried out at a temperature in the range from 125 to 350° C., for example, from 200 to 260° C. The pressure can range from 5 to 150 bar, for example, from 5 to 80 bar absolute. In the Fischer-Tropsch synthesis, for example, more than 65 wt % of C4-C90 hydrocarbons, for example, more than 85 wt % C4-C90 hydrocarbons can be formed. Depending on the catalyst and the conversion conditions, the amount of heavy wax C20-C90 hydrocarbons may be up to 60 wt %, for example, up to 70 wt %, for example, up to 85 wt %.

Catalysts for use in the Fischer Tropsch reaction can comprise, for example, a metal from Group VIII of the Periodic Table of Elements. Catalytically active metals can include ruthenium, iron, cobalt and nickel, of which cobalt is exemplary. To have a large active metal surface, the Fischer-Tropsch catalytically active metal can be supported on a porous carrier which can be a refractory metal oxide or silicate or a combination thereof. Examples of porous carriers include silica, alumina, titania, zirconia, ceria, gallia.

The Fischer-Tropsch catalytically active metal may be present in the catalyst together with one or more metal promoters or co-catalysts. Depending upon the promoter, it can be present as a metal or as a metal oxide. Exemplary metal promoters include rhenium, platinum and palladium. Examples of metal oxides comprise titanium, zirconium, manganese and/or vanadium derivatives.

As an example, a Fischer-Tropsch catalyst may comprise cobalt as a catalytically active metal and zirconium as a promoter or cobalt as a catalytically active metal and manganese and/or vanadium as a promoter, wherein the cobalt: (manganese+vanadium) atomic ratio can be at least 12:1.

The Fischer-Tropsch catalyst can be subjected to calcination to remove crystal water, to decompose volatile decomposition products and to convert organic and inorganic compounds to their respective oxides. After calcination, the resulting catalyst may be activated by contacting the catalyst with hydrogen or a hydrogen-containing gas, for example, at temperatures of about 200 to 350° C.

The Fischer-Tropsch synthesis may be carried out in a slurry phase regime or an ebullating bed regime, wherein the catalyst particles are kept in suspension by an upward superficial gas and/or liquid velocity. Optionally, a fixed bed Fischer-Tropsch process can be used, such as a multi-tubular fixed bed.

The steam to gas ratio can also affect the production of hydrocarbons (mainly methane) by the Fischer-Tropsch reaction. To minimize such undesirable reactions, a minimum steam to gas ratio of 0.4 can be ensured in the WGS.

Wash steps contributing to the overall performance of an exemplary process can be employed. According to an exemplary embodiment, said process further comprises at least one wash step. The at least one washing step can be selected from sulfate washes, alcohol washes, water washes, pyridine washes, etc. For example, a methanol wash step can be applied prior to reactions wherein water free conditions are employed.

Examples of other washes are disclosed, for example, in DE 102007051181. The method can involve selectively scrubbing materials of respective types by raw gas that is guided in a reverse flow to a physical acting detergent in two steps. A methanol stream can be produced via a pipeline by separation of one type of material. Another methanol stream can be produced from a portion of the detergent that is free from the other type of material and loaded with the materia, in one of steps, by separation of the material. The methanol stream can be re-guided as the detergent in one of scrubbing steps.

DE 19610846 A1, provides an example of a process for removing hydrogen cyanide by a wash. It comprises physical scrubbing of the gas to remove H2S and the other acidic components using a scrubbing agent, which can be regenerated and reused in the process with simultaneously scrubbing out hydrogen cyanide with H2S and the acidic components. Then SO2 can be added followed by NH3 and/or alkali to the scrubbing agent.

To clean the synthesis gas from metal carbonyls, any suitable process can be employed. For example, in a so called Rectisol method, disclosed in patent publication DE 26 10 892, the crude gas can be initially subjected to a HCN removal using a small portion of a regenerated methanol as scrubbing liquid, in a prescrubbing step. Then the crude gas can be scrubbed with the main quantity of the regenerated methanol to absorb H2S therefrom. Both the prescrubbing methanol and the main scrubbing methanol can be charged with substances absorbed from the gas and contain the metal carbonyl. Methanol can be utilized at a temperature of −60 C to 0 C. Then methanol can be subjected to expansion, evacuation, thermal treatment for outgasing and then a further heating step with any additional treatment in a reactor prior to recycling. With this process, the formation of deposits of heavy metal compounds, for example, metal sulfides formed from the metal carbonyls, can be prevented in the outgasing column of gas scrubbers and the operating life of such equipment is increased.

An exemplary method for the removal of metal carbonyl compounds is disclosed in Patent Application DE 43 36 790. In this process, before being admitted to a regenerating column, a highly loaded and a poorly loaded scrubbing liquid stream can be heated and each is fed to a reactor. The highly loaded stream of the scrubbing liquid, together with the condensate which is produced by the partial condensation of the vapor from the condensation system of the regenerating column can be fed to a reactor providing a sufficient residence time.

An exemplary methanol wash is disclosed in US 2005/0035326. A methanol/water scrubbing solution containing colloidal metal sulfides formed from metal carbonyls and resulting from the scrubbing of synthesis gas, can be subjected to agglomeration of the metal sulfides before the scrubbing solution to be separated enters the separating column. The agglomeration can be carried out in a precipitation vessel and the scrubbing liquid can be diluted before it enters the precipitation vessel.

Optionally, an exemplary method can further comprise a step wherein carbon dioxide is withdrawn from the gas downstream any gas washing process arranged before the Fischer-Tropsch reactor. Suitable means for separating carbon dioxide from the gas include, for example, membrane filtration, pressure swing absorption and washing with a liquid capable of absorbing carbon dioxide.

The hydrocarbons recovered from the overall process after FT reaction and optionally further process steps can comprise mainly linear hydrocarbons having from 4 to 90 carbon atoms, referred here as C4-C90 hydrocarbons. Some branched hydrocarbons can be present in the product but, for example, the majority of the product hydrocarbons can be linear. Primarily the hydrocarbons can be saturated (alkanes) although unsaturated compounds can be included in a minor amount of less than 10 mol-%, for example, less than about 5 mol-%. Depending on the catalyst used, some oxygenated hydrocarbons can be formed as impurities in the FT reaction.

The hydrocarbons recovered from an exemplary process can be further treated to produce a fuel or lubricant for combustion engines. An exemplary embodiment is to produce hydrocarbons suitable for fuel applications having distillation cut points in the range of about 40 to 350° C., for example, 180 to 300° C. The carbon numbers of such compositions are in the range of 10 to 25. The fuel may be, for example, LPG (liquefied petroleum gas), gasoline, diesel or any jet fuel.

In case of waxes and similar hydrocarbons which can be solid or semi-solid at ambient temperature and also in case of any high-molecular weight hydrocarbons, the hydrocarbon composition obtained from FT-synthesis can be further processed by hydrogenation with hydrogen gas at an increased temperature in the presence of a catalyst in order to produce a hydrocarbon composition suitable as a diesel class hydrocarbon or as composition from which such a hydrocarbon can be produced. For example, hydrogenation with hydrogen gas can be performed at a temperature of about 220-270° C. in a fixed bed reactor. The catalyst can be supported or unsupported metal catalyst, for example, nickel on carbon.

After the hydrogenation, for example, an isomerization step can be performed to produce paraffinic hydrocarbons and similar composition for use as fuels.

According to another exemplary embodiment, the process can be employed to produce hydrocarbons suitable for lubricant applications, said compositions having carbon numbers in the range of 30 to 40.

For example, adjusting the hydrogen to carbon monoxide ratio can be applicable to alternative processes upstream and downstream from WGS. Disclosed herein is an example of one exemplary embodiment where the syngas from biomass produced by gasification is at a temperature of about 750-950° C. Then the product of the gasification still contains some unreacted hydrocarbons. For example, in order to convert all hydrocarbons to syngas components or increase conversion, the effluent of a gasifier can be fed into a reformer, for example, a thermal reformer or catalytic reformer, wherein the gas can be subjected to further thermal reactions which give a syngas product mix containing less by-products.

After a reforming step, the composition of the gas can comprise, for example, from 10 to 40 vol-% CO2, from 0.5 to 6 vol-% CH4, from 20 to 40 vol-% H2, 10 to 30 vol-% CO, 100 to 400 ppm H2S and minor amounts of other impurities. It can then be subjected to WGS.

In an exemplary embodiment, the process can comprise a step of reforming the gas obtained by gasification of the biomass raw material before said water gas shift reaction. For example, the overall process can then include the following:

i) gasifying the raw material in the presence of oxygen to produce a gas comprising carbon monoxide, carbon dioxide 10-40 vol-% of the dry gas, hydrogen, hydrocarbons and at least sulfur derivative;

ii) feeding the gas obtained by gasification of the raw material into a reformer;

iii) reforming the gas in the presence of oxygen in order to increase the ratio of hydrogen to carbon monoxide in a gaseous effluent of the reformer to a value in the range of 0.5 to 1.5;

iv) withdrawing the gaseous effluent from an outlet of the reformer;

v) converting said effluent with a water gas shift reaction employing a FeCr-catalyst, wherein at least a part of said carbon monoxide reacts to carbon dioxide and hydrogen;

vi) feeding the gas to a Fisher-Tropsch reactor;

vii) converting in the Fisher-Tropsch reactor at least a part of the carbon monoxide and hydrogen contained in the gas into a hydrocarbon composition comprising $C_4$-$C_{90}$ hydrocarbons; and viii) recovering the hydrocarbons.

For example, gasification i) can be carried out at a first temperature and reforming iii) at a second temperature, said second temperature being higher than the first temperature. According to an exemplary embodiment, said reforming can be carried out in catalyst bed reformer at a temperature in excess 600° C., for example, a maximum temperature inside reformer can be about 900-1200° C. For example, the reforming can be conducted as a two-step (for example, two-reactor) procedure, wherein different temperatures can be applied and a peak temperature of 1200° C. can be employed in the second reactor.

EXAMPLES

Example 1

A FeCr Catalyst: Immediate Effect of Impurities on CO Conversion

Reactor Set-up

The WGS reaction experiments were carried out at a micro reactor using simplified model gas composition. The reactor system included two consecutive packed bed reactors (ø 2 cm) with heated gas and water feed lines and online product gas analyzers. Gases were fed from gas bottles except hydrogen from a hydrogen compressor line. Water was fed from air-pressurized heated tank (80° C.) using a pneumatic pump. Water tank was placed on a balance to monitor the water feed. After the reactor the gas was led through a cold trap (to condense water at 5° C.) and a gas bell to venting.

Catalyst Packing

First reactor, reactor 1, was packed with inert silicon carbide (SiC) and used as a pre-heater to ensure that feed gases are fully heated before entering the second reactor, reactor 2. The FeCr catalyst was ground and sieved to a particle size of 0.15-0.355 mm. Reactor 2 was packed with 4 g of catalyst diluted with SiC using a volume ratio 1:1. Four thermocouples were inserted into the thermocouple pocket.

Test Conditions

No special catalyst pretreatment was applied. Reactor 1 was heated to 400° C. and reactor 2 to 300° C. in $N_2$ and pressure adjusted to 5 bar before the feed gas mixture was introduced to the reactor and Reactor 2 temperature set to 400° C. Pressure in all impurity experiments was 5 bar and temperature 400° C. Total feed flow was 12 l/h, corresponding to GHSV of 3000 h-1. The basic feed composition is shown in Table 2.

TABLE 2

Basic feed composition.

| GHSV 1/h | Total flow Nl/h | $H_2O$ vol. % | CO vol. % | $CO_2$ vol. % | $H_2$ vol. % | $N_2$ vol. % | $CH_4$ vol. % |
|---|---|---|---|---|---|---|---|
| 3000 | 12.0 | 36 | 12 | 22 | 24 | 5 | 1 |

The impurity components were purchased from AGA as dilute hydrogen mixture gases $H_2S/H_2$, $COS/H_2$ and $NH_3/H_2$. Their feed concentrations were varied in the experiment (see Table 3), so that $H_2S$ feed was 0 ppm, 100 ppm or 500 ppm (from total feed in ppmv), COS feed 0 ppm or 85 ppm and $NH_3$ feed 0 ppm or 800 ppm. Pure $H_2$ feed was balanced to obtain the correct total hydrogen feed.

TABLE 3

Sequence of feed impurity additions; each condition was kept for several days.
Impurities (ppm$_v$)

—
100 ppm $H_2S$
500 ppm $H_2S$
100 ppm $H_2S$
100 ppm $H_2S$ + 85 ppm COS
100 ppm $H_2S$
100 ppm $H_2S$ + 800 ppm $NH_3$
100 ppm $H_2S$
100 ppm $H_2S$ + 85 ppm COS + 800 ppm $NH_3$
100 ppm $H_2S$
—
500 ppm $H_2S$
500 ppm $H_2S$ + 85 ppm COS + 800 ppm $NH_3$
100 ppm $H_2S$ + 85 ppm COS + 800 ppm $NH_3$
shut-down Product Analyses The product gas was analyzed online using a Fourier transform infrared analyzer and a gas chromatograph (HP 5890) with FID and TCD (flame-ionization and thermal conductivity) detectors. GC analysis was from dry gas (i.e. gas after the 5° C. cold trap), whereas FTIR analysis was from wet gas (before the cold trap). Three or four GC injections were made and results calculated as average. FTIR spectra were recorded for minimum of one hour using cycles of 20 s measurement+5 min waiting. FTIR results were also calculated as average. When sulfur components and/or ammonia were present in the feed, some water samples from the cold trap were analyzed for $H_2S$ and $NH_3$ concentrations.

Result Calculation

CO conversions were calculated based on GC results. Since water is removed before the GC analysis, GC result is for dry portion of the product gas. Portion of dry gas from total gas amount changes during reaction as hydrogen production consumes water. CO concentrations from dry product gas were converted to concentrations from total product gas according to equation:

$$CO_{tot} = CO_{dry}/(12/(7.7+((H_2O_{in}/0.8)-(H_2O_{out}/0.8)))) \quad (2)$$

wherein 12 is the total feed/product flow (l/h)

7.7 is the dry feed flow (l/h)

0.8 is mass of one liter of steam (g).

$H_2O_{in}$ and $H_2O_{out}$ were determined from feed tank and 5° C. cold trap product weights.

FTIR results were too instable to be used in these calculations.

Results
CO-conversion

The effect of different impurity components in the feed were assessed comparing CO conversions. Each condition was kept at least for several days and conversions calculated as an average based on GC results as shown above. Equilibrium CO conversion in test conditions (temperature and feed composition) were about 75% (for example, theoretical maximum).

The CO conversion with no impurities in the feed was 56%. When 100 ppm $H_2S$ was added to the feed, the conversion decreased slightly to 55% but when $H_2S$ feed was increased to 500 ppm, the conversion decreased further to 51%. When $H_2S$ feed was restored to 100 ppm, conversion returned upwards to 53%. However, water feed was too low at this point (more discussion below). Water feed was restored to original level and after this, a combination of 100 ppm $H_2S$ and 85 ppm COS in the feed led to a conversion of 55%. At this point, the baseline of GC indicated some fouling in the GC column and it was purified by baking.

After baking, a feed with 100 ppm $H_2S$ led to conversion of 57%. Combination of 100 ppm $H_2S$ and 800 ppm $NH_3$ in the feed led to a conversion of 60%. After this, $NH_3$ was removed from feed but conversion stayed at 61%. Then feed was changed to 500 ppm $H_2S$, 85 ppm COS and 800 ppm $NH_3$ and this led to conversion of 56%. Finally, a combination of 100 ppm $H_2S$, 85 ppm COS and 800 ppm $NH_3$ in the feed led to conversion of 61%.

Figure 1:
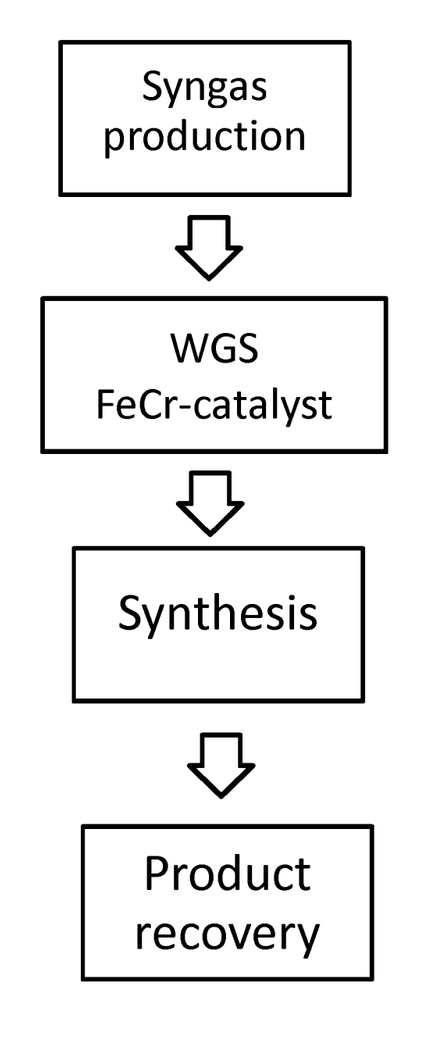
FIG. 1 is a block diagram of exemplary process steps of a method, according to an exemplary embodiment.

There was some fluctuation in the water feed during the test run. Over time, water feed from the pump decreased slightly, which was compensated by increasing the pump setting. On average, the water feed was 3.1-3.8 g/h except during one 100 ppm $H_2S$ test point feed was only 2.5 g/h (FIG. 1, 4th column). The equilibrium conversion of CO changes as the water feed changes. Aspen simulations showed that a water-to-carbon monoxide feed ratio decrease from 3 to 2 (corresponds to water feed decrease from 3.5 g/h to 2.5 g/h) could result in conversion decrease of about 6 percentage units. If water feed decrease is smaller, the effect on conversion is also smaller. Based on this, it could be estimated that conversion error margin in this study is about ±2-3%-units. Consequently, the results indicate that at 100 ppm level of $H_2S$, the effect on CO conversion is negligible. The effect of 500 ppm $H_2S$ was five times higher compared to 100 ppm and it is above error margin. 85 ppm COS had no clear effect on CO conversion and 800 ppm $NH_3$ even seemed to increase conversion slightly. Negative effect of 500 ppm $H_2S$ as well as positive effect of 800 ppm $NH_3$ remained for several days even after the feed was changed back to normal.

When sulfur components and/or ammonia were present in the feed, some water samples from the +5° C. cold trap were analyzed for $H_2S$ and $NH_3$ concentrations. In all samples $H_2S$ content was ppm. With 800 ppm $NH_3$ in the feed, $NH_3$ contents in the water were around 400-700 ppm (there were fluctuations in the ammonia feed, see 3.3). With 100 ppm $H_2S$+800 ppm $NH_3$ in the feed, the pH of cold trap water was 6.7. With only 100 ppm $H_2S$ in the feed, the pH was 5.0. The pH of pure ion-exchanged water was 5.6.

Hence, practically no immediate decrease on the CO conversion was observed with sulfur content on 100 ppm and very modest with 500 ppm. If using gas feed without sulfur in it as a reference, even with said higher sulfur content, over 85% of the conversion obtainable with the reference can be maintained. With 100 ppm, respective conversion is over 95% of the reference. It can be concluded that a FeCr-catalyst is suitable for WGS reaction in the conditions of the present method.

In practice, this also means, that short term fluctuation in the sulfur content in the feed has a negligible immediate effect on the conversion. This can be beneficial in comparison to catalysts employing pre-sulfidation prior to WGS reaction. When using biomass as raw material, the sulfur content in syngas thereof produced can vary depending on the origin and biology as explained above. Presence of ammonium in the $NH_3$ feed gas as impurity, appears to increase the conversion.

Example 2

CO Conversion; Effect of Temperature and Pressure on the Conversion

Materials and Methods

The effect of temperature and pressure on the CO conversion was studied in laboratory equipment. In experiments, 50 ml of the catalyst was packed into a tubular gas reactor, wherein no additional filling materials were used in packing. A thermocouple was situated in the middle of the catalyst bed. The reactor was placed inside of an oven. The line for evaporated water and the line from the bypass line of the reactor to the FTIR analyzer and the condenser were heated.

In the WGS process the reactor was first purged with $N_2$ (AGA, 99.999%) flow of 1 $dm^3$/min for 10 minutes. Reactor was left in nitrogen atmosphere. The reactor was heated to 300 or 400° C. with heating range of 20° C./min. The flow rates of reactants CO (Linde, 99.97%), $CO_2$ (AGA, 99.99%), $H_2$ (AGA, 99.999%) and $CH_4$ (Linde, 99.95%) were set to be 0.24, 0.47, 0.46 and 0.03 respectively. $H_2S$ was fed using $N_2$ as carrier, $H_2S/N_2$ (AGA, 0.5 vol-%). The ion exchanged water was fed to the evaporator at 400° C. The flow rate of generated water vapor was 0.7 $dm^3$/min. The total gas flow was kept constant at 2 $dm^3$/min (NTP).

The composition of the feed gas mixture was first analyzed by the FTIR and the gas analyzer. Next the gas mixture was fed into the reactor. The changes in the catalyst activity were monitored by the gas analyzer and the FTIR. Once the reaction had reached the steady state, the total flow rate of the dry gas was measured by gas meter. If additional reaction conditions were tested, temperature and pressure were usually changed with constant feed gas flow in the reactor. It was also possible to feed the gas mixture to the bypass line of the reactor for the time the conditions were changed. Results were compiled to table 4.

TABLE 4

Effect of temperature and pressure on the CO conversion.

| Temperature [° C.] | 300 | 400 | 400 | 400 | 400 |
|---|---|---|---|---|---|
| Pressure [bar] | 1 | 1 | 5 | 1 | 5 |
| $H_2S$ [ppm] | 100 | 100 | 100 | 370 | 370 |
| CO conversion [% of the theoretical maximum] | 7 | 65 | 75 | 60 | 70 |

From these results, it can be concluded, that optimal temperature for WGS reaction with gas originated from biomass gasification is about 400° C. Further, these results show that increasing pressure eliminates the adverse effect caused by sulfur derivatives, especially, $H_2S$.

Example 3

A FeCr Catalyst: Long Term Effect of Impurities on the Catalyst Itself

Materials and Methods

Spent catalyst was analyzed for carbon and sulfur impurities using SEM-EDS (scanning electron microscopy with semiquantitative elemental mapping) and TPO (temperature programmed oxidation). Observations by eye and photographs were recorded as well.

HTS catalysts, such as FeCr, can have a long life time. The loss of activity can be caused by slow thermal sintering. Sintering means that $Fe_3O_4$ crystals agglomerate together and this causes decrease of surface area which further causes loss of catalytic activity. Chromium oxide in the catalyst acts as a stabilizer and can slow down sintering.

Catalyst Reduction

In some reductive conditions, the FeCr catalyst can undergo an over-reduction which causes the reduction of iron oxides to metallic iron. For example, in metallic form iron is no longer catalytically active in water gas shift reaction; it can catalyze side reactions such as Fischer-Tropsch and methane formation (Ratnasamy and Wagner, p. 338, second paragraph). It can be desirable to avoid FeCr over-reduction. The fresh and used catalysts were evaluated by eye.

Results

Spent Catalyst Analyses

Elemental analyses of spent catalyst samples are shown in Table 5.

TABLE 5

Quantitative and semiquantitative elemental analyses on spent catalysts.

| Element (wt-%) | Reactor 2 spent catalyst | Reference spent catalyst from sulfur-free conditions |
| --- | --- | --- |
| C | 3.5 | 4.5 |
| S | 0.001 | 0 |

Sulfur content of Reactor 2 spent catalyst was very low. Consequently, despite the long test duration (6 months), catalyst was not significantly sulfided in these conditions, in other words, sulfur did not accumulate significantly on the catalyst. This was contrary to literature, where it was stated that the FeCr catalyst is sulfided during use (under sulfur containing conditions) and, in the sulfided state its activity is much lower than in the oxide state (Ratnasamy and Wagner, p. 362, last paragraph). In other experiments the catalyst could be observed to have absorbed some sulphur, which however did not compromise the conversion of CO.

Spent catalyst samples were also examined for metal phases. No metallic iron was detected in the spent catalyst. Thus, no over-reduction in the conditions of the present experiments was taking place, even though the test run lasted for 6 months and impurity concentrations were significant. It can be concluded that the finding of the activity maintenance and resistance to catalyst deactivation are now evidenced for long term runs.

As a conclusion on the catalyst analyses, an exemplary FeCr catalyst showed long term tolerance for sulfur-containing feed gas as well as varying sulfur contents in the feed gas. Contrary to a comparative embodiment, the sulfur did not accumulate on the catalyst.

Example 4

Syngas from Gasified Biomass

Materials and Methods

The method was tested as an up-scaled experiment using real syngas. The feed gas for the WGS reaction was synthesis gas from gasification of forest residues. Such a feed inherently comprises some sulfur. Sulfur content in this experiment was measured to be 90 mol-ppm (dry gas).

Feed and product gas compositions were measured using on-line process analyzers, of which CO, $CO_2$ and $CH_4$ with IR-detector and $H_2$ with TCD-detector.

The reactor used for WGS was an adiabatically operating fixed bed reactor, wherein 97 $dm^3$ of FeCr catalyst was packed as 6×6 mm particles. The pressure applied was 510 kPa(g). A temperature in the middle of the catalyst bed was 385° C.

A part of the gas obtained from the gasification was directed to the WGS reactor and another part of the feed was set to bypass the WGS reactor in order to control the $H_2$/CO ratio of the product gas.

Results

The gas compositions were measured both from the feed and from the product gas after WGS reaction. These values are compiled in table 6.

TABLE 6

Feed and product gas composition (mol-% of dry gas).

| Component | Feed | Product |
| --- | --- | --- |
| CO | 20.1 | 6.1 |
| $CO_2$ | 33.0 | 40.8 |
| $H_2$ | 31.0 | 39.0 |
| $CH_4$ | 3.3 | 2.9 |
| $H_2/CO_2$-ratio | 1.6 | 6.4 |

Water content of the feed gas was 39 mol-%.

The exact ratio of the part subjected to WGS reaction and the part by-passed was not reliably determined. As the composition of the product gas corresponds significantly to theoretical equilibrium composition in these conditions, there is a reason to believe that some shift reaction also took place in the by-pass part, which was subjected to a hydrolysis reaction.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for adjusting hydrogen to carbon monoxide ratio in syngas, the method comprising:
   providing a syngas produced from a biomass raw material, said syngas comprising carbon monoxide, hydrogen, 10-40 vol-% of carbon dioxide, and at least one sulfur derivative as an impurity; and
   converting at least a part of said carbon monoxide in the presence of steam to carbon dioxide and hydrogen with a water gas shift reaction in the presence of a FeCr catalyst.

2. The method according to claim 1, wherein said syngas further comprises $NH_3$.

3. The method according to claim 1, wherein a content of said sulfur derivative in said syngas is less than 900 ppm.

4. The method according to claim 1, wherein said water gas shift reaction is conducted at a temperature between 270° C. and 510° C.

5. The method according to claim 1, wherein said water gas shift reaction is conducted at a pressure between 1 to 10 bar.

6. The method according to claim 1, wherein said FeCr catalyst is not sulfided prior to use in the water gas shift reaction.

7. The method according to claim 1, further comprising converting the syngas to a product selected from the group consisting of alcohols, alkyl carbonates and hydrocarbons having a carbon number from C4 to C90.

8. A method for producing hydrocarbons from a biomass raw material, the method comprising:
gasifying a biomass raw material in the presence of oxygen to produce a gas comprising carbon monoxide, 10-40 vol-% of carbon dioxide, hydrogen, hydrocarbons, and at least one sulfur derivative as impurity;
converting at least a part of said carbon monoxide to carbon dioxide and hydrogen with a water gas shift reaction in the presence of a FeCr catalyst;
converting in a Fisher-Tropsch reactor at least a part of the carbon monoxide and hydrogen into a hydrocarbon composition comprising $C_4$-$C_{90}$ hydrocarbons; and
recovering at least a part of the $C_4$-$C_{90}$ hydrocarbons.

9. The method according to claim 8, further comprising reforming the syngas downstream from gasifying the biomass raw material and upstream from said water gas shift reaction.

10. The method according to claim 8, further comprising at least one wash step.

11. The method according to claim 8, wherein the recovered hydrocarbons are treated to produce a fuel or lubricant for combustion engines.

12. The method according to claim 8, comprising producing hydrocarbons suitable for fuel applications having distillation cut points in a range of about 40 to 350° C.

13. The method according to claim 8, comprising producing hydrocarbons suitable for lubricant applications, said hydrocarbons having carbon numbers in a range of 30 to 40.

14. The method according to claim 1, wherein the content of said sulfur derivative in said syngas is from 30 ppm to 500 ppm.

15. The method according to claim 1, wherein said water gas shift reaction is conducted at a temperature between 300° C. and 510° C.

16. The method according to claim 1, wherein said water gas shift reaction is conducted at a temperature between 380° C. and 430° C.

17. The method according to claim 4, wherein said water gas shift reaction is conducted at a pressure between 1 to 10 bar.

18. The method according to claim 1, wherein said water gas shift reaction is conducted at a pressure between 3 to 6 bar.

19. The method according to claim 4, wherein said water gas shift reaction is conducted at a pressure between 3 to 6 bar.

20. The method according to claim 9, further comprising at least one wash step.

21. The method according to claim 8, comprising producing hydrocarbons suitable for fuel applications having distillation cut points in a range of 180 to 300° C.

22. The method according to claim 8, wherein the content of said sulfur derivative in said syngas is from 30 ppm to 500 ppm.

23. The method according to claim 1, wherein the water gas shift reaction is a sour gas shift reaction wherein sulfur compounds are not removed from the syngas prior to conducting the water gas shift reaction.

24. The method according to claim 8, wherein the water gas shift reaction is a sour gas shift reaction wherein sulfur compounds are not removed from the syngas prior to conducting the water gas shift reaction.

25. The method according to claim 1, wherein said syngas further comprises $NH_3$ in an amount of 50 to 10,000 ppm.

26. The method according to claim 8, wherein said syngas further comprises $NH_3$ in an amount of 50 to 10,000 ppm.

* * * * *